(12) United States Patent
Chrysos

(10) Patent No.: US 7,689,844 B2
(45) Date of Patent: *Mar. 30, 2010

(54) CREDIT-BASED ACTIVITY REGULATION WITHIN A MICROPROCESSOR BASED ON AN ACCUMULATIVE CREDIT SYSTEM

(75) Inventor: George Chrysos, Milford, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/005,473

(22) Filed: Dec. 27, 2007

(65) Prior Publication Data

US 2008/0109634 A1    May 8, 2008

Related U.S. Application Data

(63) Continuation of application No. 11/095,339, filed on Mar. 30, 2005, now Pat. No. 7,353,414.

(51) Int. Cl.
G06F 1/32 (2006.01)
G06F 15/76 (2006.01)

(52) U.S. Cl. .................. 713/320; 713/323; 712/214

(58) Field of Classification Search .................. 713/320, 713/323; 712/1, 214
See application file for complete search history.

(56) References Cited

U.S. PATENT DOCUMENTS

| | | | |
|---|---|---|---|
| 5,719,800 A | 2/1998 | Mittal et al. ................. | 713/321 |
| 6,826,704 B1 | 11/2004 | Pickett ....................... | 713/320 |
| 6,901,524 B2 | 5/2005 | Watts, Jr. .................... | 713/322 |
| 6,931,559 B2 | 8/2005 | Burns et al. ................. | 713/340 |
| 7,114,086 B2 | 9/2006 | Mizuyabu et al. ........... | 713/320 |
| 7,194,643 B2 | 3/2007 | Gonzalez et al. ............ | 713/320 |
| 7,237,131 B2 * | 6/2007 | Kwa et al. ................... | 713/323 |
| 7,353,414 B2 * | 4/2008 | Chrysos ....................... | 713/320 |
| 2004/0054857 A1 | 3/2004 | Nowshadi .................... | 711/153 |
| 2004/0226016 A1 | 11/2004 | Sreejith ...................... | 718/104 |
| 2006/0206740 A1 | 9/2006 | Hurd .......................... | 713/322 |
| 2006/0206898 A1 | 9/2006 | Miner et al. ................. | 718/104 |

* cited by examiner

*Primary Examiner*—Chun Cao
(74) *Attorney, Agent, or Firm*—Trop, Pruner & Hu, P.C.

(57) ABSTRACT

A technique to control power consumption within a microprocessor. More particularly, embodiments of the invention relate to a technique to control power and performance within one or more microprocessors by enforcing a credit-based instruction execution rate algorithm.

20 Claims, 4 Drawing Sheets

CREDIT-BASED ACTIVITY REGULATION WITHIN A MICROPROCESSOR BASED ON AN ACCUMULATIVE CREDIT SYSTEM

This application is a continuation of U.S. patent application Ser. No. 11/095,339 filed Mar. 30, 2005 now U.S. Pat. No. 7,353,414 entitled "CREDIT-BASED ACTIVITY REGULATION WITHIN A MICROPROCESSOR" the content of which is hereby incorporated by reference

BACKGROUND

Embodiments of the invention relate to microprocessors and microprocessor systems. More particularly, embodiments of the invention relate to regulating the activity level of one or more microprocessors based on the accumulation and expenditure of instruction execution rate credits.

As processor clock speeds increase and power consumption budgets decrease, processor and computer system designers must develop new ways to control power without degrading performance. Power and performance considerations become increasingly significant as the number of processors within a microprocessor die or the number of processors on separate die within the same computer system increases.

Typically, microprocessor and computer system designers must work within a voltage/frequency ("V/f") envelope when designing the processor system. For example, a processor having multiple processor cores may be capable of operating each core at a maximum frequency at certain operating voltage levels. However, the processor or system may have to be designed such that the processors do not operate at their maximum frequency across all possible operating voltages for extended periods of time, because doing so may result in damage to one or more of the processors or the computer system.

Dynamic power consumption of a processor or computer system can be calculated using various equations or algorithms, including: $P=A*C*V^2*f$, where "P" is power, "A" is activity of the processor or system, "C" is the capacitance observed by the processor or system, "V" is the operating voltage, and "f" is the frequency of the processor(s). Prior art techniques for preventing a processor or system from exceeding the maximum sustainable voltage and frequency include analog detection mechanisms that sense when a processor or system is becoming too hot or consuming too much current. The detection mechanism may then force the voltage and/or frequency lower in response to detecting that the processor or system has exceeded thermal or current consumption limits.

Analog detection mechanisms, however, are limiting in the sense that processor or system performance is not determinable and may depend upon the manufacturing characteristics of the processor or system, operating environment, and other factors. Furthermore, analog detection mechanisms may require that the voltage and frequency of the processor or system be set at conservative levels to ensure enough time to react to sudden variations in current drawing or thermal events. These variations can be caused by changes in activity level on the processor or system due to program execution characteristics. For example the processor might be mostly idle, waiting for data to return from main memory one moment, and in the next moment, when the data has returned, it may be executing instructions at peak rate.

Prior art power control techniques include micro-architectural regulating techniques, such as controlling the number of instructions issued within a processor per processor cycle. Typically, instruction issue rate control techniques prevent the processor from issuing instructions for execution per cycle above a certain threshold. The maximum instruction rate is typically set once for a relatively long interval on the processor, (i.e. the instruction rate control threshold cannot be changed numerous times in short succession during the normal operation of the processor ("dynamically"), but must be changed, if at all, by firmware or software writing a configuration register at longer range intervals.

As with analog detection mechanisms, typical instruction rate control techniques require a conservative approach in order to prevent the processor from being harmed in the event of a sudden variation in current, performance, or thermal characteristics of the processor. In the case of prior art instruction rate control techniques, this means that a sudden increase in performance demand cannot be handled by the processor, thereby incurring performance penalties.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to microprocessors and computer systems. More particularly, embodiments of the invention relate to a technique to control power and performance within one or more microprocessors by enforcing a credit-based instruction execution rate algorithm.

Embodiments of the invention accommodates variations in activity levels due to variations in performance demand on a processor while protecting the processor or computer system from current or thermal events that can harm the processor or system. Embodiments of the invention may be used within a single core microprocessor, within a multi-core processor, or within a multi-processor computer system.

At least one embodiment of the invention accommodates variations in performance demand while enforcing an average activity limit by allowing the average instruction issue rate within a processor to fluctuate according, to an accumulative "credit" system. In other embodiments, the credit system can be used in conjunction with other variations within the processor besides the instruction issue rate. For example, in one embodiment, the credit system described herein may be used in conjunction with variations in the instruction decoding rate, retirement rate, or some combination of the instruction decoding, retirement, and/or issue rate.

Figure 1:
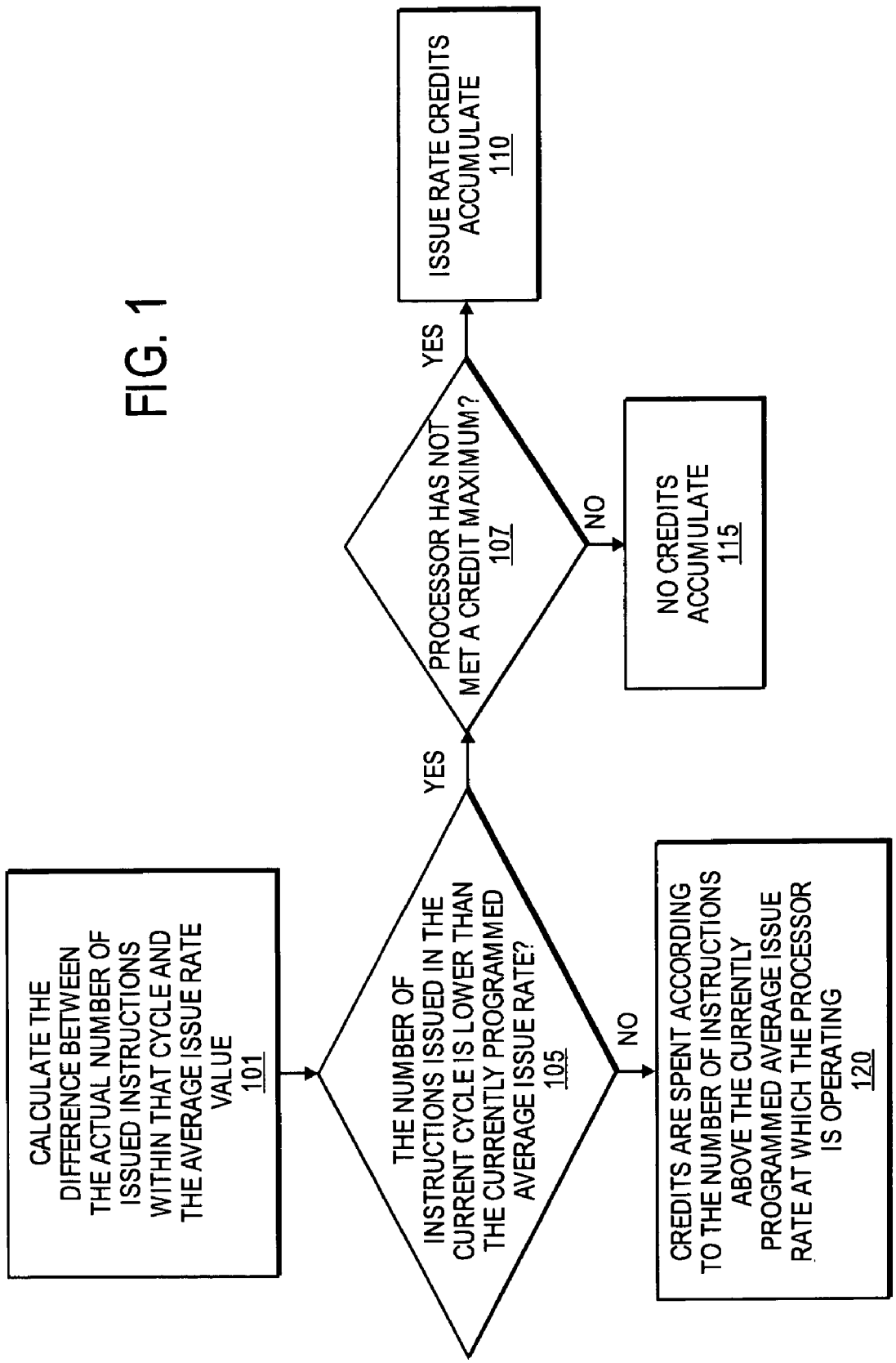
FIG. 1 is a flow diagram illustrating operations used according to embodiment of the invention.

In one embodiment, an average instruction issue rate within a processor is controlled according to an algorithm illustrated in FIG. 1. In FIG. 1, at each processor cycle, the difference between the actual number of issued instructions within that cycle and the average issue rate value is calculated at operation 101. In one embodiment, the average issue rate is a variable value that can be programmed into the processor at various points during the operation of the processor by a software or firmware program. In other embodiments, the average issue rate is not variable and cannot be changed, if at all, without rebooting the processor. If the number of instructions issued in the current cycle is lower than the currently programmed average issue rate at operation 105, then issue rate credits accumulate at operation 110, such that if the processor has not exceeded a credit maximum at operation 107, the processor may exceed the average issue rate during subsequent processor cycles until the credits are exhausted. If the credit maximum has been met, then no further credits may be accumulated, if at all, until the number of credits falls below the credit maximum at operation 115.

In one embodiment, the credit maximum is a variable value that can be programmed into the processor at various points during the operation of the processor by a software program. In other embodiments, the credit maximum is not variable and cannot be changed, if at all, without rebooting the processor. The credit maximum may be dependent upon various operating factors of the processor or computer system. For example, if the credit maximum is set too high, bursts of activity causing greater performance demands on the processor may be allowed to persist for relatively long periods of time, which may result in excessive power demands or fluctuations within the processor or system. Accordingly, the credit maximum is set, in one embodiment, to a level accounting for the possible thermal or current fluctuations that may occur during the operation of the processor.

In one embodiment, the credit maximum corresponds to the maximum allowable instruction issue burst length within the processor. However, in other embodiments, the credit maximum may correspond to other processing characteristics, such as the instruction decode rate, retirement rate, or some combination of the instruction decode, retirement, and/or instruction burst length.

If the number of instructions issued in the current cycle is higher than the currently programmed average issue rate operation 105, then credits are spent according the number of cycles above the currently programmed average issue rate at which the processor is operating at operation 120. Credits continue to be spent as long as the processor operates above average issue rate until all credits are exhausted. The processor must then operate at an issue rate not greater than the average issue rate until more credits, if any, are accumulated.

Figure 2:
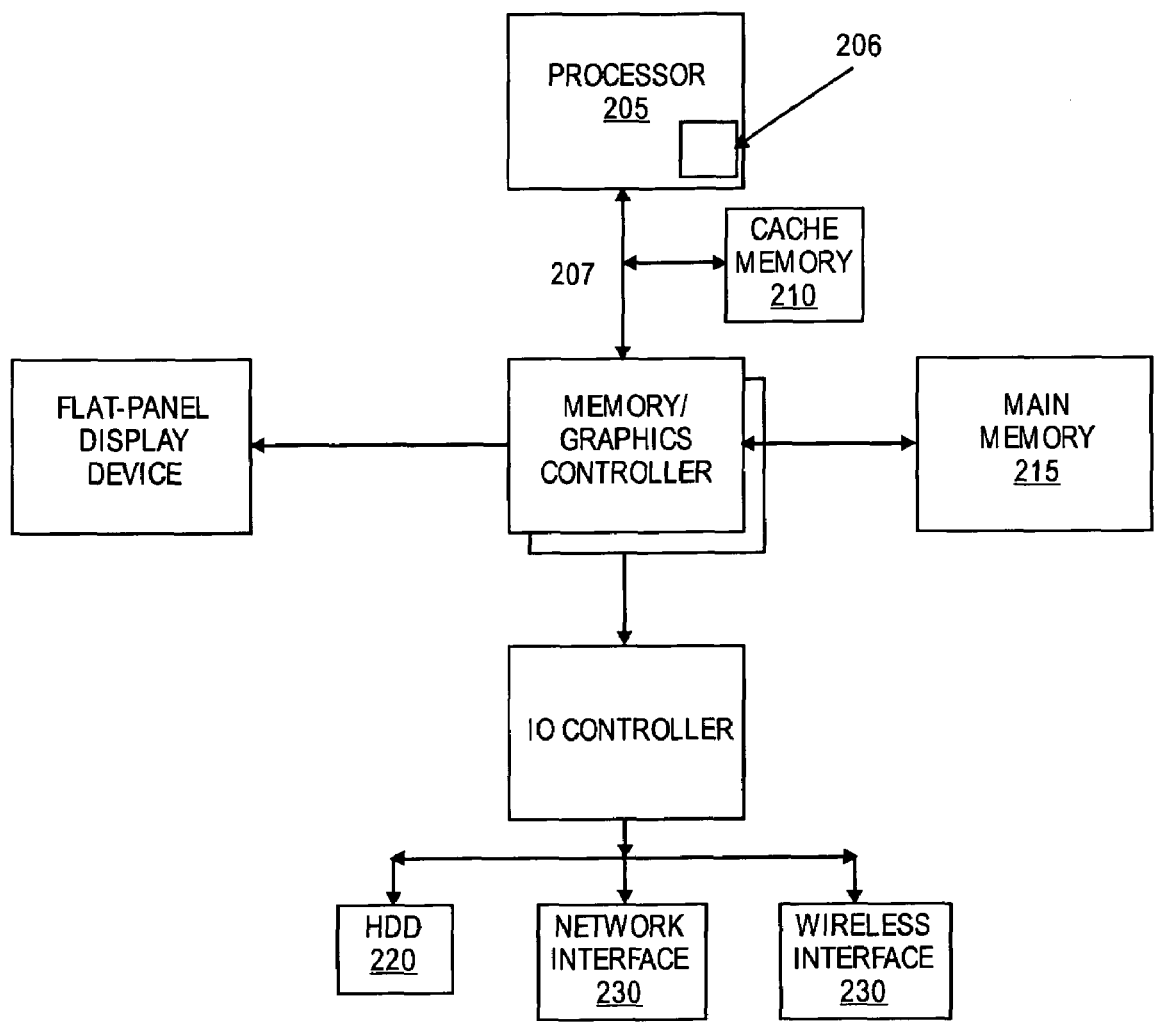
FIG. 2 is a front-side-bus (FSB) computer system in which one embodiment of the invention may be used.

FIG. 2 illustrates a front-side-bus (FSB) computer system in which one embodiment of the invention may be used. A processor 205 accesses data from a level one (L1) cache memory 210 and main memory 215. In other embodiments of the invention, the cache memory may be a level two (L2) cache or other memory within a computer system memory hierarchy. Furthermore, in some embodiments, the computer system of FIG. 2 may contain both a L1 cache and an L2 cache, which comprise an inclusive cache hierarchy in which coherency data is shared between the L1 and L2 caches.

Illustrated within the processor of FIG. 2 is one embodiment of the invention 206. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207. Furthermore, the cache memory may contain relatively fast memory cells, such as a six-transistor (6T) cell, or other memory cell of approximately equal or faster access speed.

The computer system of FIG. 2 may be a point-to-point (PtP) network of bus agents, such as microprocessors, that communicate via bus signals dedicated to each agent on the PtP network. Within, or at least associated with, each bus agent is at least one embodiment of invention 206, such that store operations can be facilitated in an expeditious manner between the bus agents.

Figure 3:
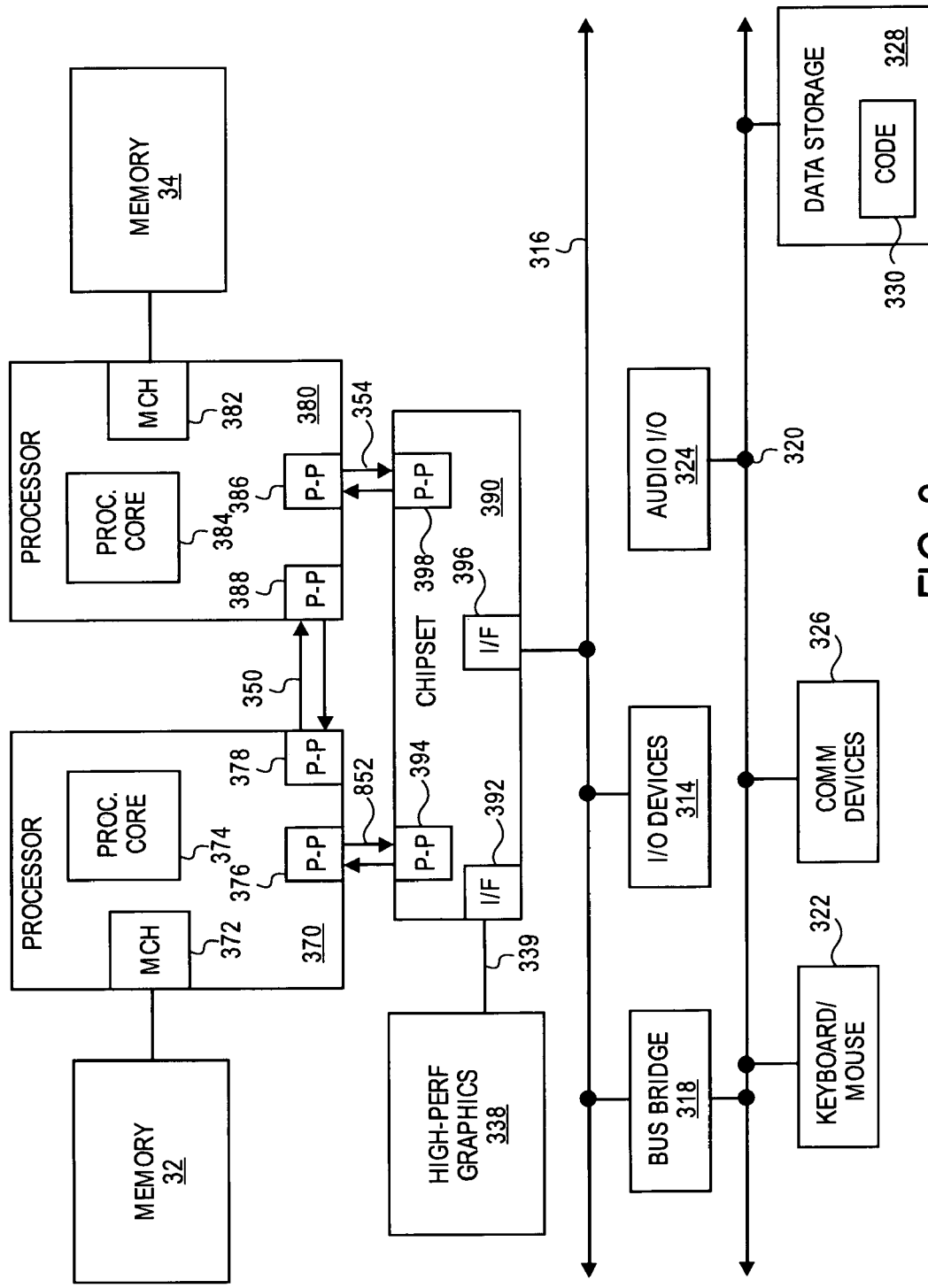
FIG. 3 is a point-to-point (PtP) computer system in which one embodiment of the invention may be used.

FIG. 3 illustrates a computer system that is arranged in a point-to-point (PtP) configuration. In particular, FIG. 3 shows a system where processors, memory, and input/output devices are interconnected by a number of point-to-point interfaces.

The system of FIG. 3 may also include several processors, of which only two, processors 370, 380 are shown for clarity. Processors 370, 380 may each include a local memory controller hub (MCH) 372, 382 to connect with memory 22, 24. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339.

At least one embodiment of the invention may be located within the PtP interface circuits within each of the PtP bus agents of FIG. 3. Other embodiments of the invention, however, may exist in other circuits, logic units, or devices within the system of FIG. 3. Furthermore, other embodiments of the invention may be distributed throughout several circuits, logic units, or devices illustrated in FIG. 3.

Figure 4:
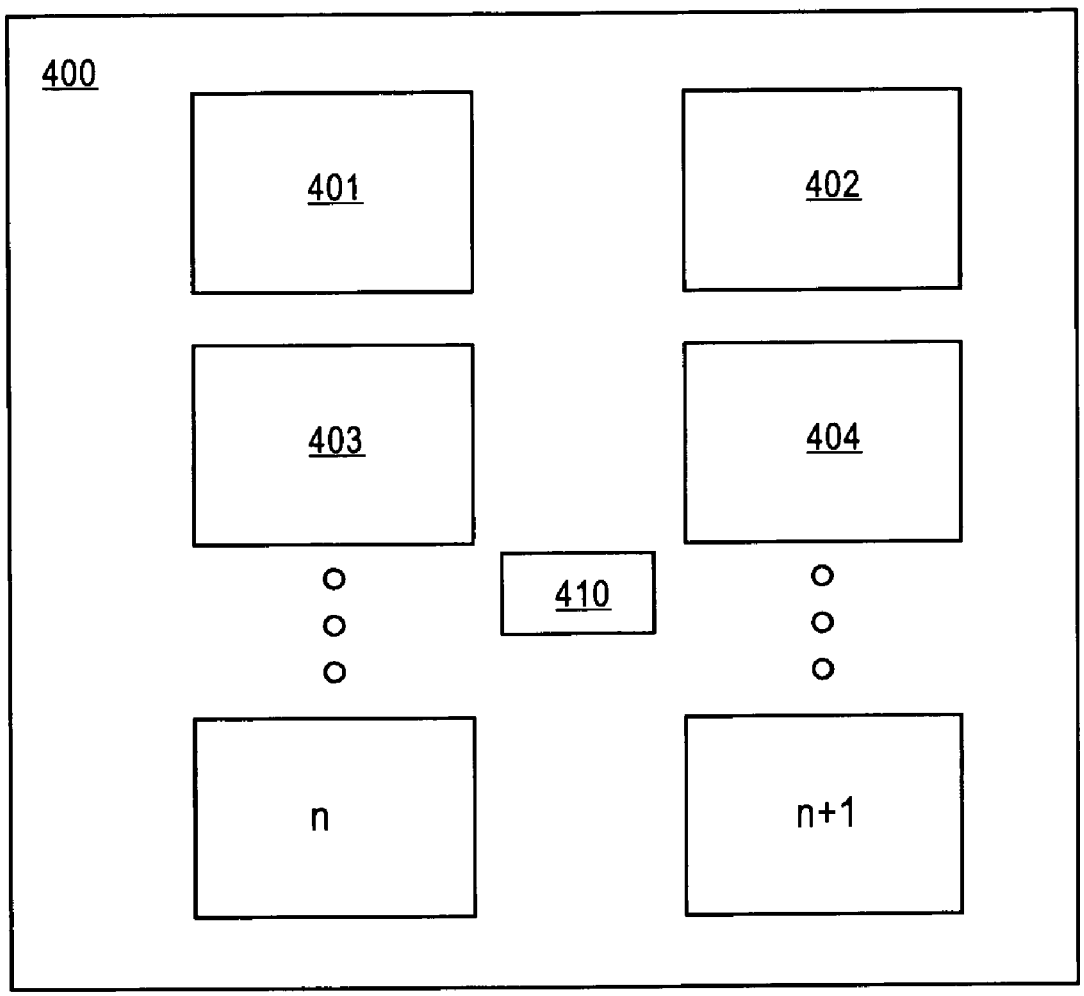
FIG. 4 is a multi-core microprocessor in which one embodiment of the invention may be used.

FIG. 4 illustrates a multi-core processor in which at least one embodiment of the invention may be used. Particularly, multi-core processor 400 includes processor cores 401 through "n", each having their activity controlled according to one embodiment of the invention being implemented within a logic circuit 410. In other embodiments the logic circuit may be within one of the processor cores or distributed throughout the cores. Furthermore, other embodiments may be implemented within a software routine being performed within or outside of one of the processor cores.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a multicore processor having a plurality of cores each having a processing rate to be controlled, based at least in part, on a number of activity level credits for the core corresponding to an extent to which the core has experienced an activity level below an average allowable activity level.

2. The apparatus of claim 1, wherein the number of activity level credits is limited by a maximum allowable number of activity level credits dependent upon a range of activity levels to be experienced by the core.

3. The apparatus of claim 1, wherein the number of activity level credits corresponds to a number of instructions exceeding the average allowable activity level that can be issued within the core.

4. The apparatus of claim 1, wherein the activity levels of the plurality of cores are to contribute to an aggregate number of activity level credits for all of the cores.

5. The apparatus of claim 4, wherein the aggregate number of activity level credits is to increase if a sum of the activity levels of the plurality of cores is below an average aggregate allowable activity level.

6. The apparatus of claim 1, wherein the multicore processor is to be protected from a thermal event by the control of the processing rate.

7. A system comprising:
a processor having a controllable power level based at least in part on an accumulative credit system in which variation in an activity level of the processor is accommodated, at least in part, based on the accumulative credit system, wherein the accumulative credit system is based on a difference between a number of issued instructions and an allowed number of issued instructions, the difference corresponding to a credit level indicative of the number of issued instructions above the allowed number of issued instructions that the processor can issue.

8. The system of claim 7, wherein if the number of issued instructions is greater than the allowed number of issued instructions, the activity level is to be reduced by reducing the number of issued instructions.

9. The system of claim 7, wherein an operating voltage and processing frequency of the processor is to be selected to maximize the number of instructions that may be issued by the processor without corrupting data within the processor or otherwise physically damaging the processor.

10. The system of claim 7, wherein the processor further comprises a first logic to control the activity level of each of a plurality of processor cores of the processor.

11. The system of claim 10, wherein the plurality of processor cores each contribute to an aggregate activity level being effected, at least in part, by a difference between a number of issued instructions of each of the plurality of processor cores and an aggregate allowed number of issued instructions.

12. The system of claim 11, wherein the first logic is to compare the number of issued instructions with the aggregate allowed number of issued instructions and to modify the activity level of at least one of the plurality of processor cores in response thereto.

13. The system of claim 12, wherein the activity level is to be modified by increasing or decreasing a number of instructions to be issued by the at least one processor core.

14. A method comprising:
changing a number of issue rate credits based on an extent to which an instruction issue rate within a core of a processor varies from an average issue rate level; and
spending the issue rate credits if an instruction issue rate in a cycle exceeds the average issue rate level.

15. The method of claim 14, further comprising accruing a maximum amount of issue rate credits, the maximum amount of issue rate credits being dependent upon a range of instruction issue rates to be experienced by the processor.

16. The method of claim 15, further comprising varying the maximum amount of issue rate credits during operation of the processor.

17. The method of claim 15, wherein the maximum amount of issue rate credits corresponds to a number of instructions that may be issued within a core of the processor.

18. The method of claim 14, further comprising calculating a difference between a number of issued instructions during a cycle and the average issue rate level, and changing the number of issue rate credits according to the difference.

19. The method of claim 18, further comprising changing the average issue rate level during operation of the processor without rebooting the processor.

20. The method of claim 14, further comprising operating the processor at an instruction issue rate not greater than the average issue rate level if the number of issue rate credits is equal to zero.

* * * * *